(12) United States Patent
Buckles et al.

(10) Patent No.: US 6,445,555 B1
(45) Date of Patent: Sep. 3, 2002

(54) METHOD AND APPARATUS FOR DISCHARGING A SUPERCONDUCTING MAGNET

(75) Inventors: Warren Elliott Buckles, Madison; Douglas C. Folts, Baraboo, both of WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/449,505

(22) Filed: Nov. 24, 1999

(51) Int. Cl.[7] .................................. H02H 7/00
(52) U.S. Cl. ........................ 361/19; 361/115
(58) Field of Search .................. 323/360; 361/19, 361/115

(56) References Cited

U.S. PATENT DOCUMENTS

| | | | |
|---|---|---|---|
| 4,962,354 A | 10/1990 | Visser et al. | 323/360 |
| 5,159,261 A | * 10/1992 | Kim et al. | 323/360 |
| 5,519,312 A | 5/1996 | Wang et al. | 323/360 |
| 5,644,218 A | 7/1997 | Emmerich et al. | 323/360 |

FOREIGN PATENT DOCUMENTS

| | | |
|---|---|---|
| EP | 0181575 | 5/1986 |
| WO | 59052809 | 3/1984 |
| WO | 5921870 | 12/1984 |
| WO | 01019929 | 1/1989 |
| WO | 05268727 | 10/1993 |

OTHER PUBLICATIONS

Search Report requesting "Voltage and Discharge and Magnet and Superconductor," Nerac, Inc., 1999, pp. 5–40.

* cited by examiner

Primary Examiner—Stephen W. Jackson
(74) Attorney, Agent, or Firm—Fish & Richardson P.C.

(57) ABSTRACT

Circuitry detects a quench in a superconducting magnet and discharges the superconducting magnet into a load, such as a utility system, at a substantially constant voltage. The circuitry can be an inverter, arranged between the superconducting magnet and the load, which may operate in overload mode during discharge. Discharging occurs until the amount of energy in the superconducting magnet is below a predetermined level.

19 Claims, 13 Drawing Sheets

METHOD AND APPARATUS FOR DISCHARGING A SUPERCONDUCTING MAGNET

INCORPORATION BY REFERENCE

The following applications are hereby incorporated by reference into the subject application as if set forth herein in full: (1) U.S. patent application Ser. No. 09/240,751, entitled "Electric Utility Network With Superconducting Magnetic Energy Storage", filed Jan. 29, 1999; (2) U.S. Provisional Application No. 60/117,784, entitled "Electric Utility Network With Superconducting Magnetic Energy Storage", filed Jan. 29, 1999; (3) U.S. patent application Ser. No. 09/449,375, entitled "Method And Apparatus For Providing Power To A Utility Network", filed Nov. 24, 1999; (4) U.S. patent application Ser. No. 09/449,436, entitled "Method And Apparatus For Controlling A Phase Angle", filed Nov. 24, 1999; (5) U.S. patent application Ser. No. 09/449,378, entitled "Capacitor Bank Switching", filed Nov. 24, 1999; (6) U.S. Provisional Application No. 09/718,672, entitled "Voltage Regulation Of A Utility Power Network", filed Nov. 24, 1999.

BACKGROUND OF THE INVENTION

This invention relates to discharging a superconducting magnet at a substantially constant voltage.

Non-cryostable superconducting magnets can develop resistive zones (or "quenches") in their interiors. If such a zone develops, high levels of energy, in particular current, in the magnet can cause the magnet severe damage. Systems therefore have been developed for discharging superconducting magnets in an attempt to avoid such damage. The foregoing is familiar to those skilled in the art of designing and fabricating superconducting magnets.

SUMMARY OF THE INVENTION

The invention is directed to discharging a superconducting magnet. In general, in one aspect, the invention features a method which detects a quench in the superconducting magnet, and which discharges the superconducting magnet into a load at a substantially constant voltage in response to detecting the quench.

Discharging the magnet at a substantially constant voltage decreases discharging time (relative to constant power or constant resistance discharge). As a result, the likelihood (and/or amount) of damage to the magnet can be reduced. Also, if the magnet is connected to a utility system, for example, through an inverter, discharging the magnet at a substantially constant voltage increases the rate at which power can be supplied to the utility network. As a result, the utility network can be stabilized more quickly following a fault.

This aspect of the invention may include one or more of the following features. The voltage may be discharged through an inverter arranged between the superconducting magnet and the load. An input of the inverter receives voltage from an output of the superconducting magnet, and the substantially constant voltage is maintained at the input of the inverter by controlling a phase relationship between voltage and current at an output of the inverter. The inverter may be operated in overload mode during constant voltage discharge. Operating the inverter in overload mode further decreases magnet discharging time.

The load may comprise a utility network and/or one or more resistive elements. One of the advantages of discharging the magnet into a utility network is that it reduces the need for additional circuitry for discharging the magnet. The quench is detected by monitoring a superconducting coil in the superconducting magnet. Discharging generally occurs until an amount of energy in the superconducting magnet is below a predetermined level. This reduces damage to the magnet. The magnet may also be discharged into a load having a substantially constant resistance. This may be done after the magnet has been discharged at the substantially constant voltage, e.g., when the magnet is no longer in serious danger of damage.

Other advantages and features of the invention will become apparent from the following description and claims.

DESCRIPTION OF THE PREFERRED EMBODIMENTS

Figure 1:
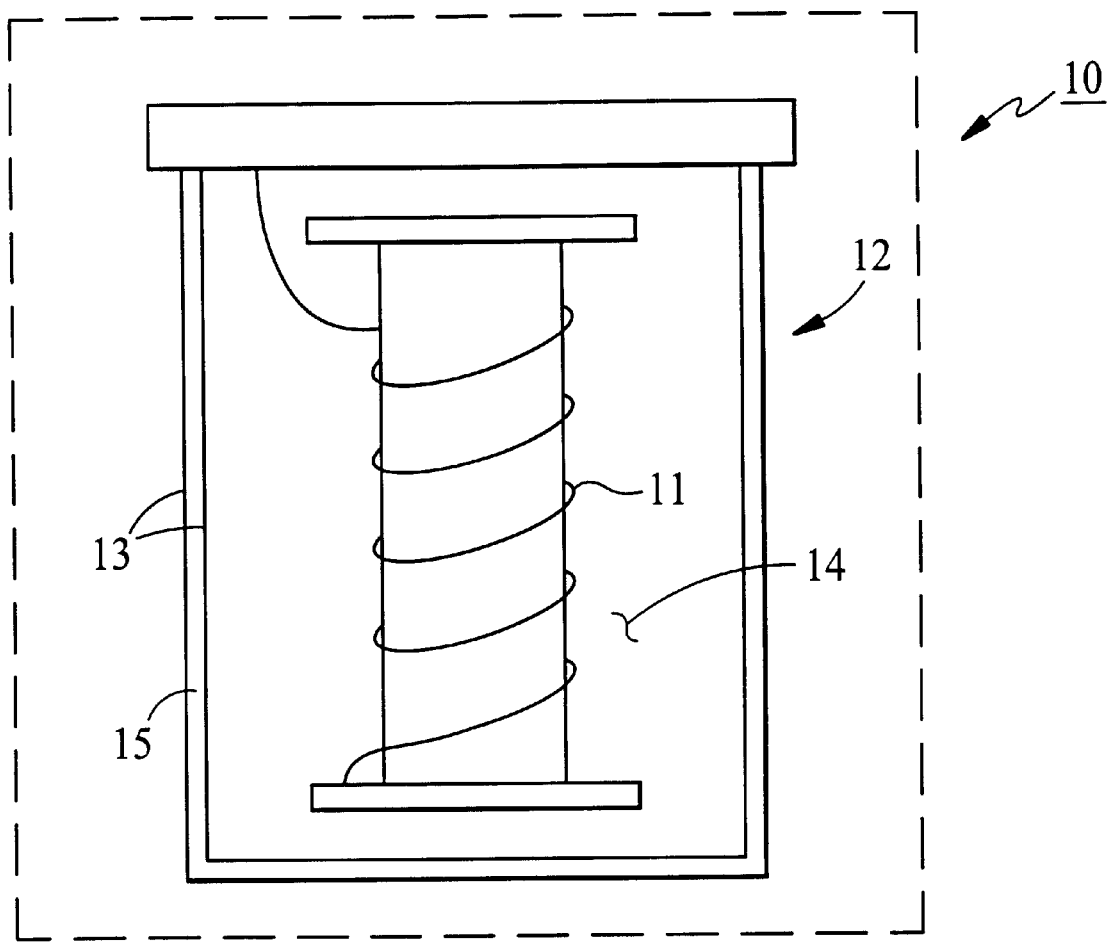
FIG. 1 view of a superconducting magnet.

Referring to FIG. 1, a superconducting magnet 10, representing a superconducting magnetic energy storage ("SMES") device and cryogenic refrigeration unit, includes an energy storage magnetic coil 11 positioned within a containment vessel 12 of the cryogenic refrigeration unit. In one embodiment, containment vessel 12 encloses magnetic coil 11 in liquid helium 14, and is fabricated from two austenitic stainless steel vessels 13 separated by a vacuum insulated space 15. In alternative embodiments, vessels 13 may be formed of stainless steel, aluminum, or epoxy fiberglass composite.

The cryogenic refrigeration unit includes one or more Gifford-McMahon type coolers (not shown) operating in concert to maintain cryogenic temperatures within vessel 12 and to re-liquify helium vapor building up within the vessel. Under normal operating conditions, helium (liquid or gaseous) does not circulate outside vessel 12. External, room temperature, refrigeration system gasses are not interchanged with the internal helium supply. Preferably, the system design permits continuous operation, with one or both coolers inoperable, for a minimum of 48 hours.

Superconducting magnetic coil 11 is wound with a low-temperature superconducting cable formed from niobium-titanium copper-based matrix wire that has been cabled into a mechanically stable form and insulated prior to winding. An alternative embodiment uses a coil fabricated of high-temperature superconductor. Superconducting coil 11 also can be embodied with a high temperature superconductor cooled with an appropriate cryogen, such as helium or nitrogen. A suitable superconducting magnetic coil is available from American Superconductor Corporation of Westborough, Mass.

Discharging the Superconducting Magnet

Figure 2:
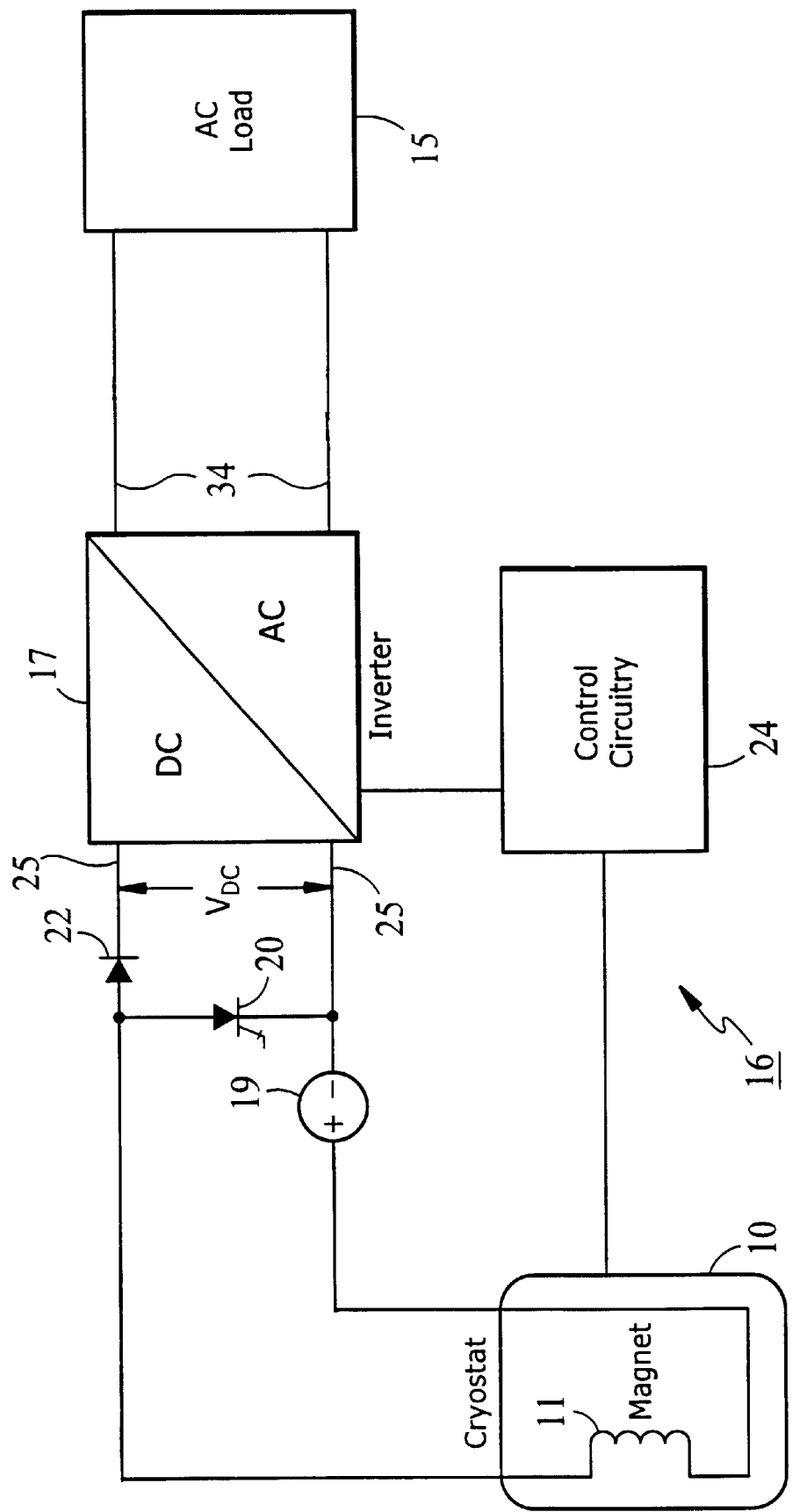
FIG. 2 is block diagram of circuitry for discharging the superconducting magnet into a load.

FIG. 2 shows superconducting magnet 10 coupled to an AC ("Alternating Current") load 15. Load 15 may represent, but is not limited to, a utility network, such as that described in U.S. patent application Ser. No. 09/240,751 and U.S. Provisional Application No. 60/117,784. Thus, load 15 may include reactive as well as resistive elements (not shown).

Arranged between load 15 and magnet 10 is circuitry 16 which couples magnet 10 to load 15. Circuitry 16 includes a magnet charger 19 for charging magnet 10. Charger 19 may be an inverter or other device which receives power from the utility network or any other external source. Circuitry 16 also includes a DC-AC (with "DC" referring to "Direct Current") power inverter 17; however, other types of circuitry may be used instead of, or in addition to, such an inverter. Inverter 17 can be any type of DC-AC power converter, such as single level H-bridge, single level six-switch, multi-level, and stacked H-bridge inverters.

Inverter 17 operates in a "discharge" mode, during which energy is provided from magnet 10 to load 15. In the "discharge" mode, inverter 17 converts DC power from superconducting magnet 10 into AC power, and provides that AC power to load 15. In this mode, thyristor 20, which serves as a switch, is biased to produce an open circuit and diode 22, which also serves as a switch, is biased to produce a short circuit. This allows current to flow from magnet 10 to load 15.

Control circuitry 24 detects increases in resistance (i.e., quenches) in superconducting magnet 10 and, in response, controls inverter 17 and switch 20 so that Ad superconducting magnet 10 discharges its energy into load 15 at a substantially constant voltage ($V_{DC}$ across terminals 25). Control circuitry 24 may include, for example, a quench comparator circuit. The quench comparator circuit detects increases in voltage across one or more portions of coil 11, which are indicative of resistance in coil 11. Control circuitry 24, including the quench comparator circuit, may be implemented as hardware or as software (computer instructions) executing on one or more controllers.

Figure 3:
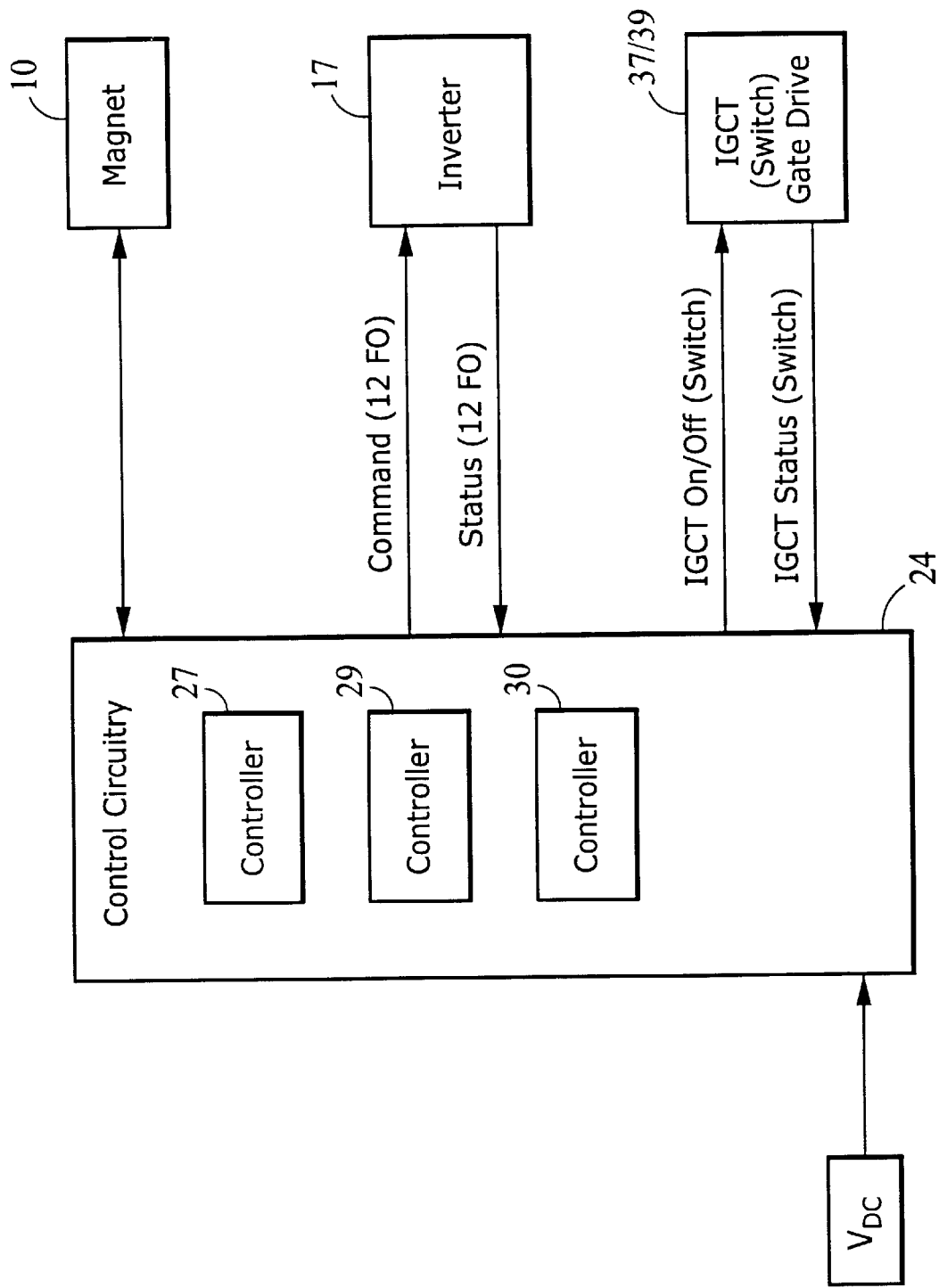
FIG. 3 is a block diagram of a control board used in the circuitry FIG. 2.

For example, as shown in FIG. 3, control circuitry 24 may comprise three controllers 27, 29 and 30 (e.g., microprocessors) on a single circuit board. In addition, this circuitry includes appropriate driver circuits and analog-to-digital ("A/D") converters (not shown).

Controller 27 executes computer instructions to control current and voltage loops in inverter 17 (for use in discharging magnet 10 and maintaining a constant output AC voltage from inverter 17, as described below). Controller 29 functions as the system controller, meaning that it executes computer instructions to detect an amount of power at load 15, to detect the quench status of superconducting magnet 10, to open or close switch 20, to control magnet charger 19, and to provide information to controller 27. Controller 30 records information obtained by or generated by controllers 27 and 29, formats that information, and displays it to a user. Although this embodiment shows three controllers, any number of controllers (e.g., one controller) can be used to perform the functions attributed to controllers 27, 29 and 30. The computer instructions executed in each controller may be stored in one or more memories (not shown) in circuitry 24 or an internal memory of each controller.

Figure 4:
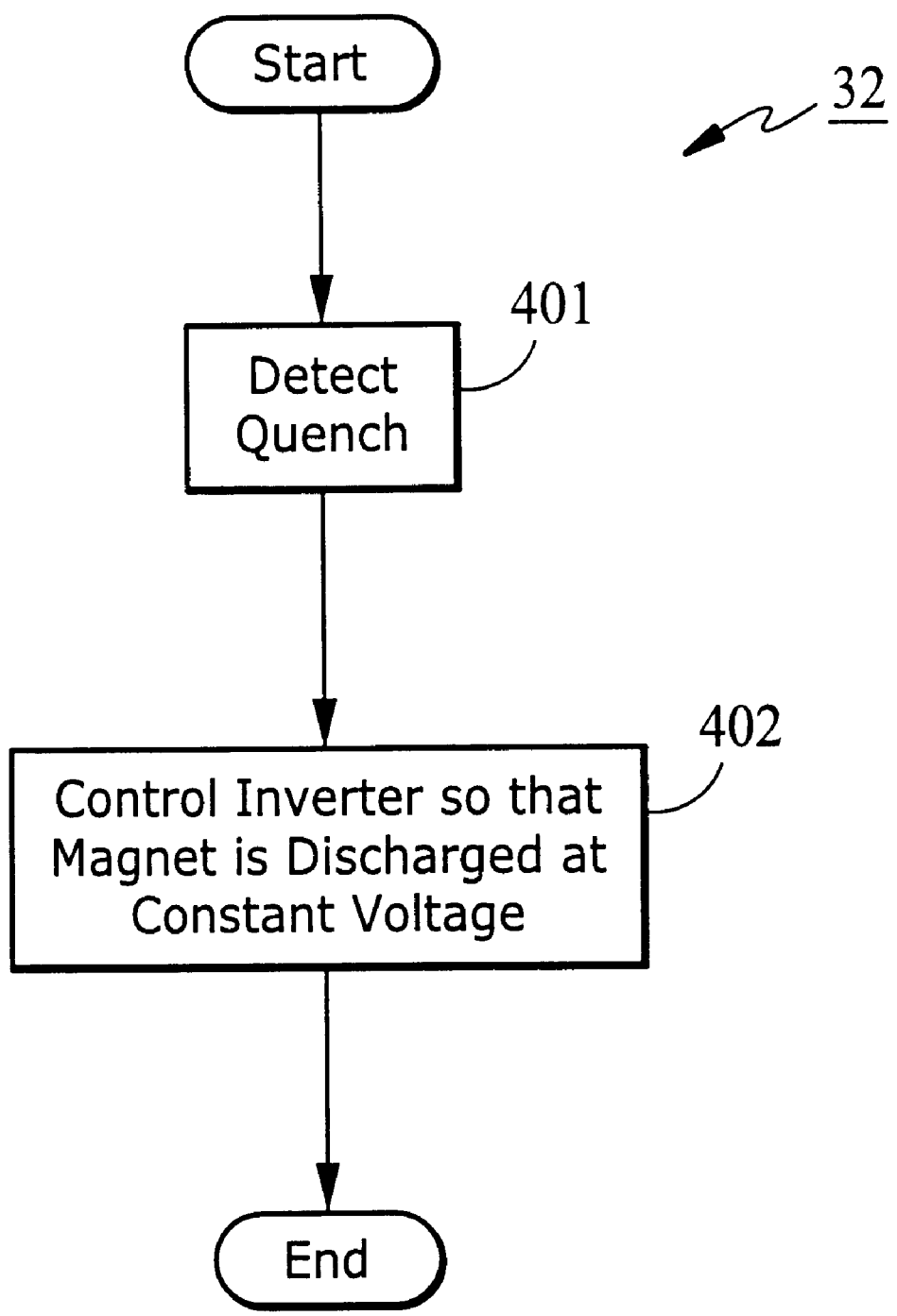
FIG. 4 is a flow diagram showing a process for discharging the superconducting magnet.

FIG. 4 shows a process 32 for discharging magnet 10. Process 32 begins by detecting 401 a quench in magnet 10. As noted, the quench is detected when a change, in particular an increase, is detected in the voltage across superconducting coil 11 in magnet 10. Detecting 401 may be performed by a cryostat controller (not shown) or by controller 29. The controller monitors the voltage across two or more symmetric winding segments of magnet coil 11. If the voltage difference between the symmetric segments exceeds a predetermined threshold, a quench is detected. In response to the increase in voltage, controller 29 instructs controller 27 to discharge energy from magnet 10. Controller 27 controls discharging (402) so that $V_{DC}$ remains substantially constant throughout the discharging time.

To maintain $V_{DC}$ substantially constant, controller 27 controls a phase relationship between the voltage and the current at the output terminals 34 (FIG. 2) of inverter 17. Specifically, controller 27 perturbates the nominal 90 degree phase angle between output AC voltage and output AC current to maintain the voltage level at DC terminals 25 at a substantially constant value. Normally, to keep $V_{DC}$ constant, as the output current from magnet 10 (namely, $I_{DEVICE}$) decreases, the output current magnitude from inverter 17 would be decreased. Since the output power is the product of the output current and utility voltage, this effectively decreases the inverter's output power to match the power available from magnet 10, which is the product of $I_{DEVICE}$ and $V_{DC}$. For utility grid stabilization, however, it is desirable to maximize both real and reactive power. Because of this, it is preferable to operate the inverter at its maximum output current rating. Hence, controlling the phase angle of the inverter output current with respect to the utility voltage is the way by which this embodiment regulates power flow and, thus, $V_{DC}$.

Figure 5:
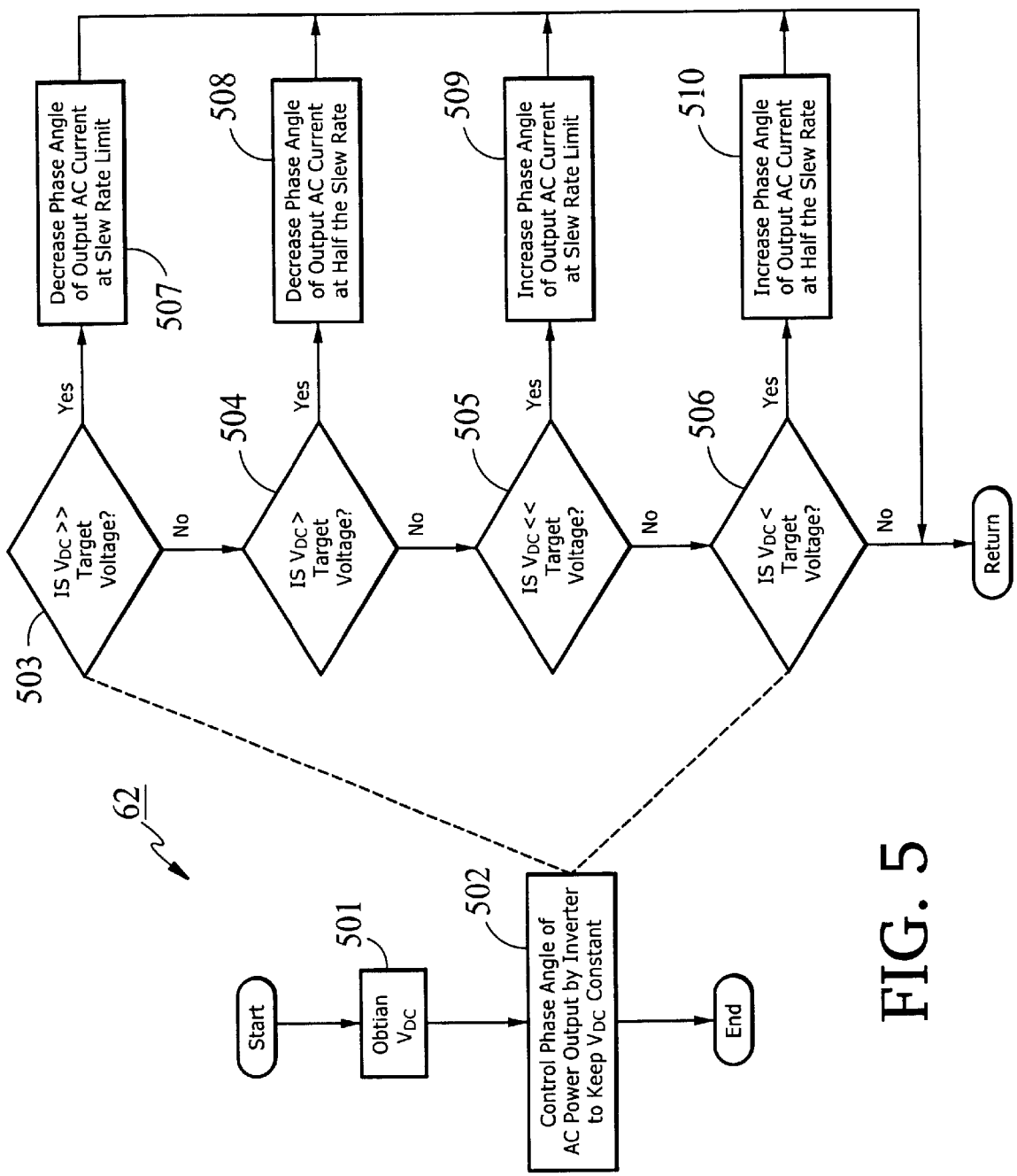
FIG. 5 is a flow diagram showing a process for controlling a phase angle of output current/power to discharge the superconducting magnet at constant voltage.

One process for controlling the phase relationship between voltage and current is shown in FIG. 5 below; however, other processes may be used. During discharge, inverter 17 may be operated in overload mode (e.g., substantially above its continuous power rating). The period during which the inverter can operate in overload mode depends upon the thermal capacity of the inverter.

Returning to FIG. 4, once magnet 10 is discharged to a predetermined level, process 32 ends. During normal discharge of magnet 10, for utility grid voltage stabilization purposes, magnet 10 may be discharged to a non-zero value. However, when magnet 10 is discharged in response to a quench, magnet 10 may discharge to zero.

Figure 6:
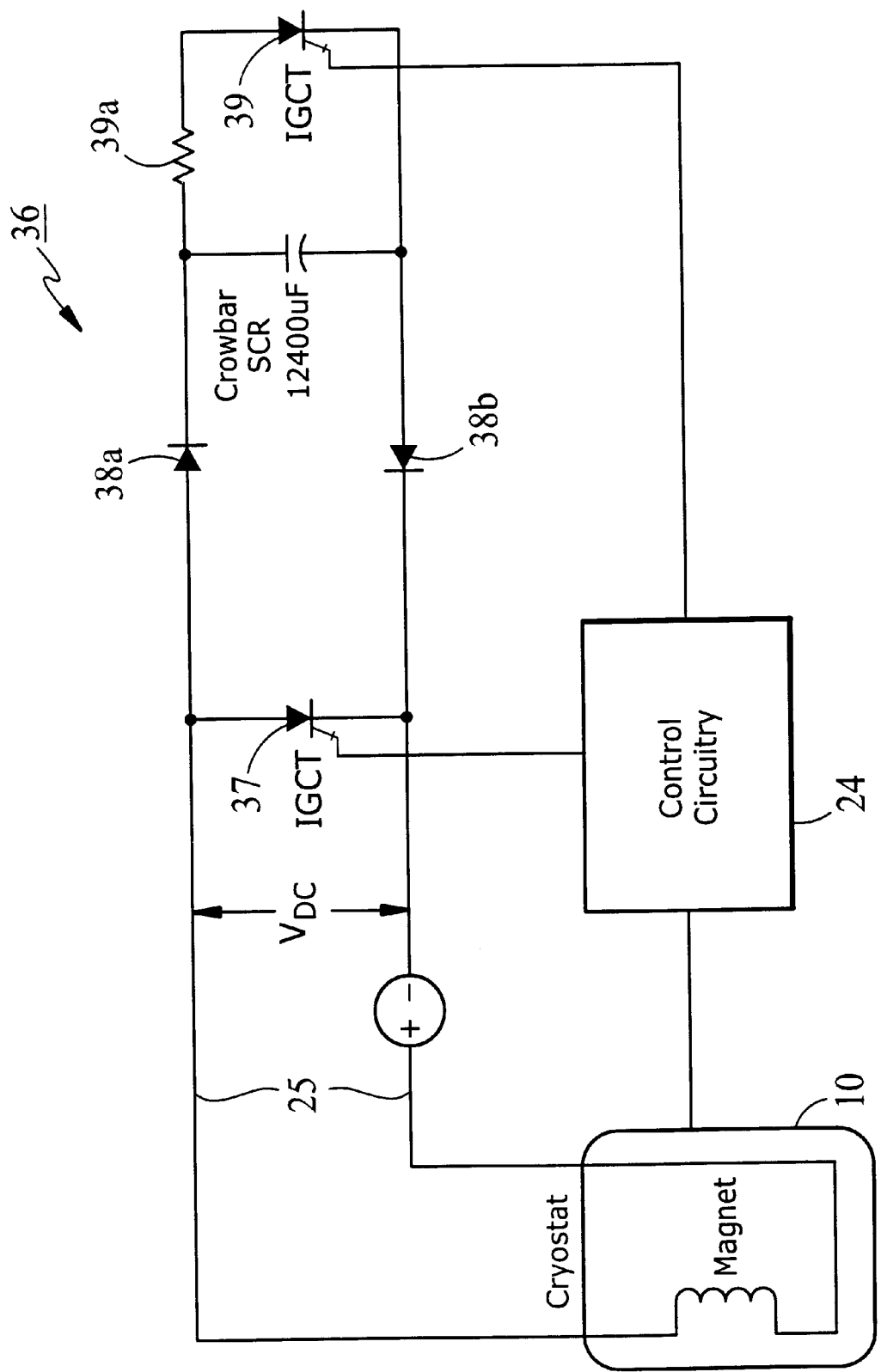
FIG. 6 is block diagram of alternative circuitry for discharging the superconducting magnet into a load.

Other circuit configurations may also be used to implement magnet discharging process 32. For example, FIG. 6 shows magnet 10 coupled to a DC load 36. In this configuration, DC load 36 includes two gate turn-off devices, such as IGCT ("Integrated Gate Commutated Thyristor") power switching devices 37 and 39 which are connected to resistive load 39a. Additional capacitive-inductive-resistive circuitry (e.g., a snubber circuit) (not shown) may be connected in parallel to the gate turn-off devices. IGCT devices 37 and 39 are alternatively opened and closed (by control circuitry 24) to discharge magnet 10 in such a way that a substantially constant voltage $V_{DC}$ is maintained across terminals 25. The resistive load 39a and IGCT devices modulate the discharged power in accordance with control signals from control circuitry 24. Output diodes 38a and 38b control power flow between IGCT devices 37 and 39. IGCT devices 37 and 39 may also be other gate-controlled semiconductor switches, such as, but not limited to, GTO's ("Gate Turn-off Thyristors") or IGBT's ("Insulated Gate Bipolar Transistors") used either singly or in series/parallel.

Figure 7:
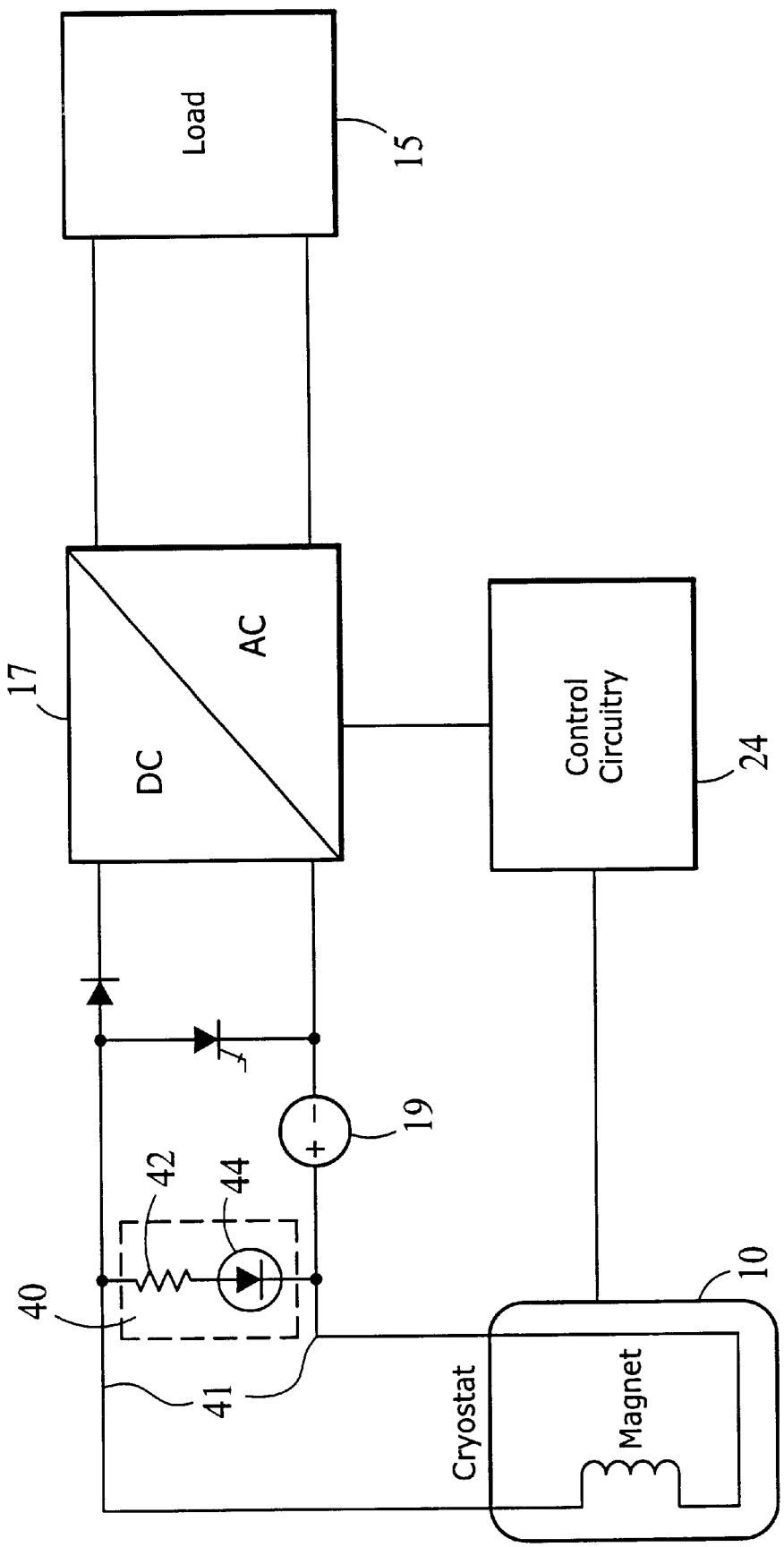
FIG. 7 is block diagram of alternative circuitry for discharging the superconducting magnet into a load.

FIG. 7 shows still another circuit configuration that may be used to implement magnet discharging process 32. This configuration is similar to that of FIG. 2, except that it includes a profiling circuit 40 in shunt across terminals 41. Profiling circuit 40 includes a resistor 42 and an SCR ("Silicon Controlled Rectifier") device 44 which operates as either an open or closed switch. If the current of magnet 10 drops below a predetermined level, such as below 25% of its maximum value (which usually occurs near the end of a discharging cycle), controller 27 outputs a signal to close the switch of SCR device 44. Triggering SCR device 44 causes current from magnet 10 to flow through profiling circuit 40, thus changing the discharging process from a constant voltage discharging process to a constant resistance discharging process.

Figure 13:
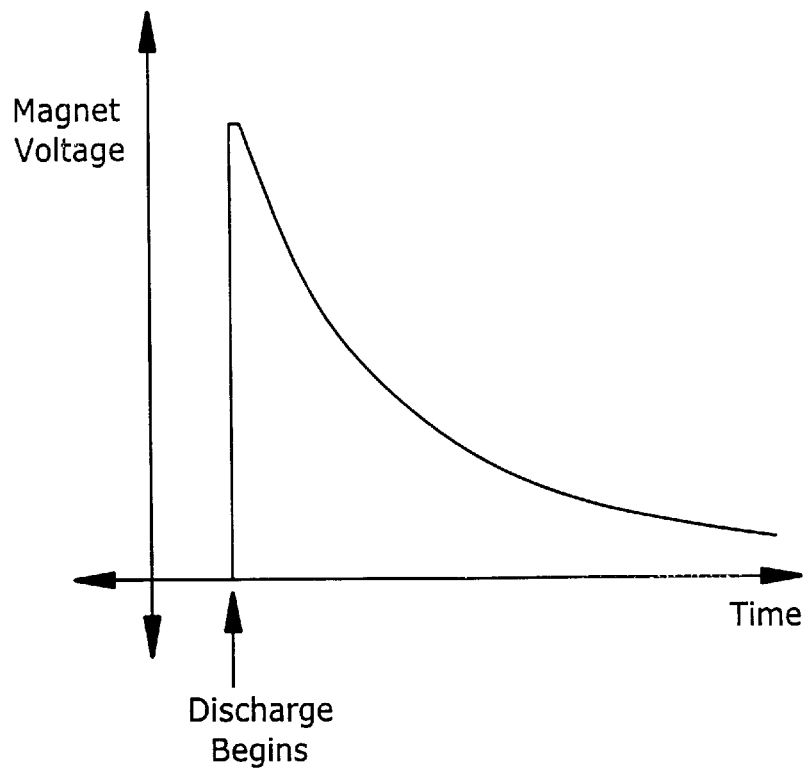
FIG. 13 is a graph showing a mode of magnet discharge.
Figure 14:
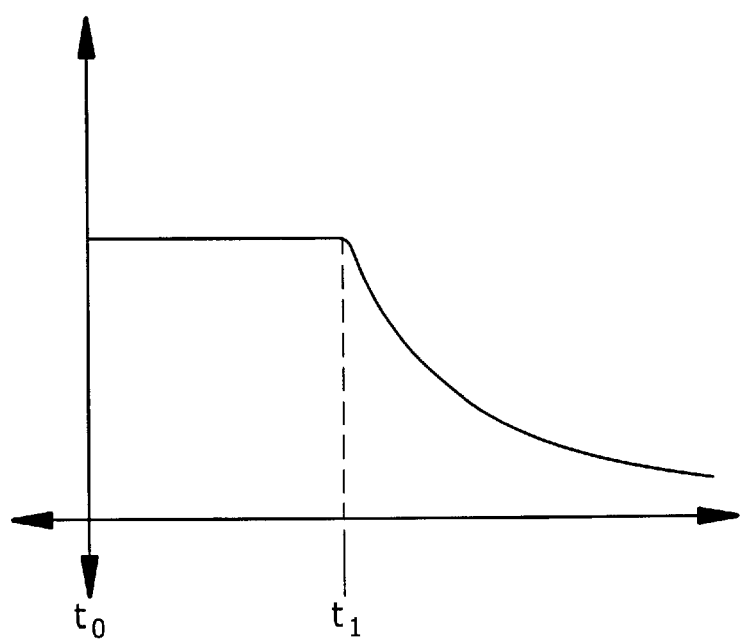
FIG. 14 is a graph showing an alternative mode of magnet discharge.

A relatively small resistance for resistor 42 causes magnet 10 to do a resistive discharge, in which the voltage of magnet 10 is low and discharge time is long (see FIG. 13). A relatively higher value for resistor 42 results in a constant voltage discharge for times $t_0$–$t_1$ and in a constant resistance discharge after time $t_1$ (see FIG. 14).

Profiling circuit 40 can be "switched in" at other points during the discharging process. For example, if inverter 17 malfunctions before or during magnet discharging, profiling circuit 40 can be "switched in" to discharge magnet 10.

Controlling Power Phase Angle to Maintain Constant Voltage

Figure 8:
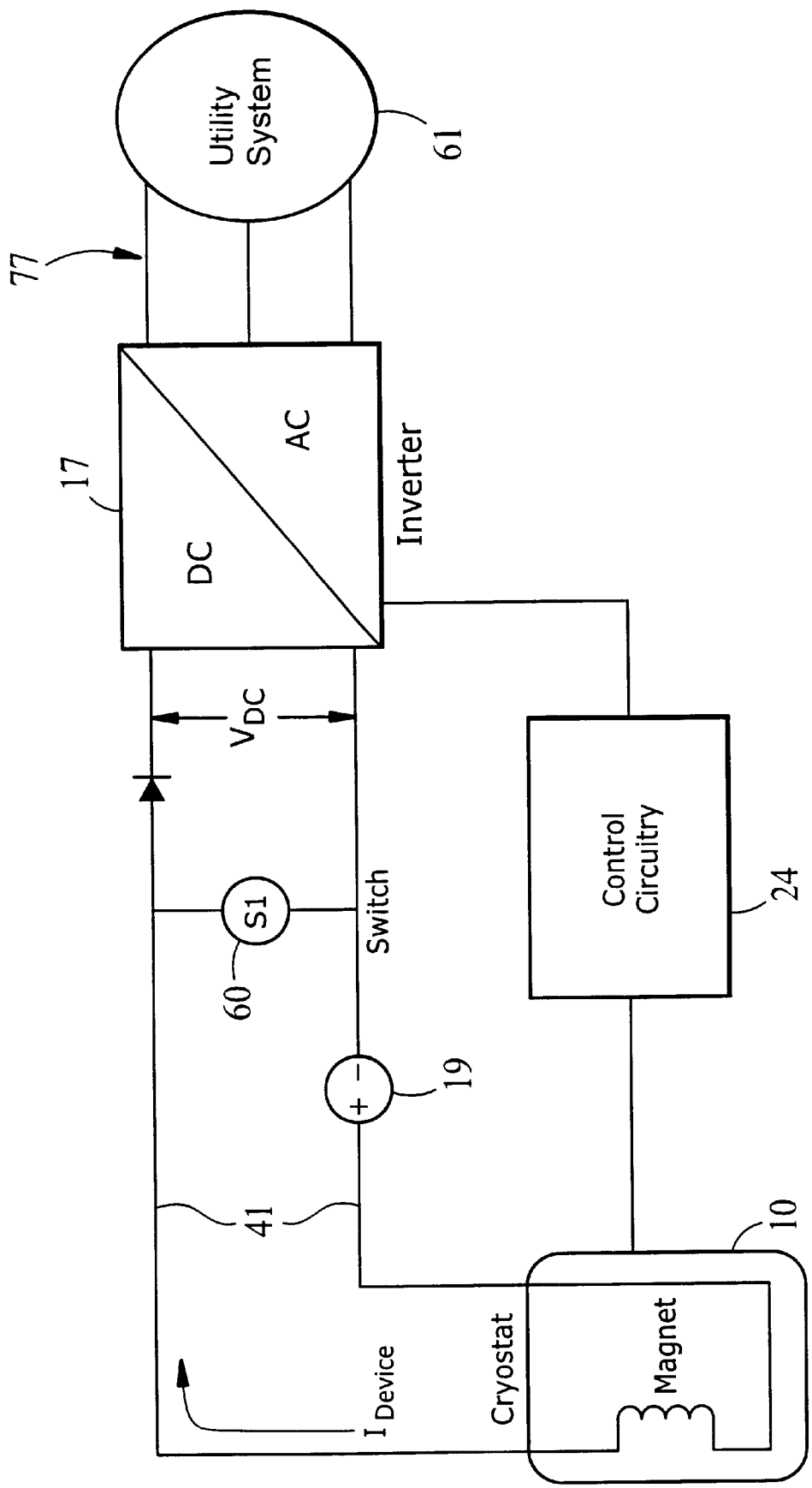
FIG. 8 is block diagram of alternative circuitry for discharging the superconducting magnet into a load.

Referring to FIG. 8, the real power output from inverter 17 is a product of $I_{DEVICE}$ and $V_{DC}$ where $I_{DEVICE}$ is the DC current from magnet 10 and $V_{DC}$ is the input DC voltage to inverter 17. As magnet 10 drains, the value of $I_{DEVICE}$ decreases. To keep $V_{DC}$ substantially constant in spite of this decrease in $I_{DEVICE}$, inverter 17 varies the phase angle of its output AC current (and thus the phase angle of the output AC power). Inverter 17 changes the phase angle to increase power flow towards the DC side or into the inverter when $V_{DC}$ is below a nominal value and to increase power flow out of the inverter when $V_{DC}$ is above the nominal value.

Figure 9:
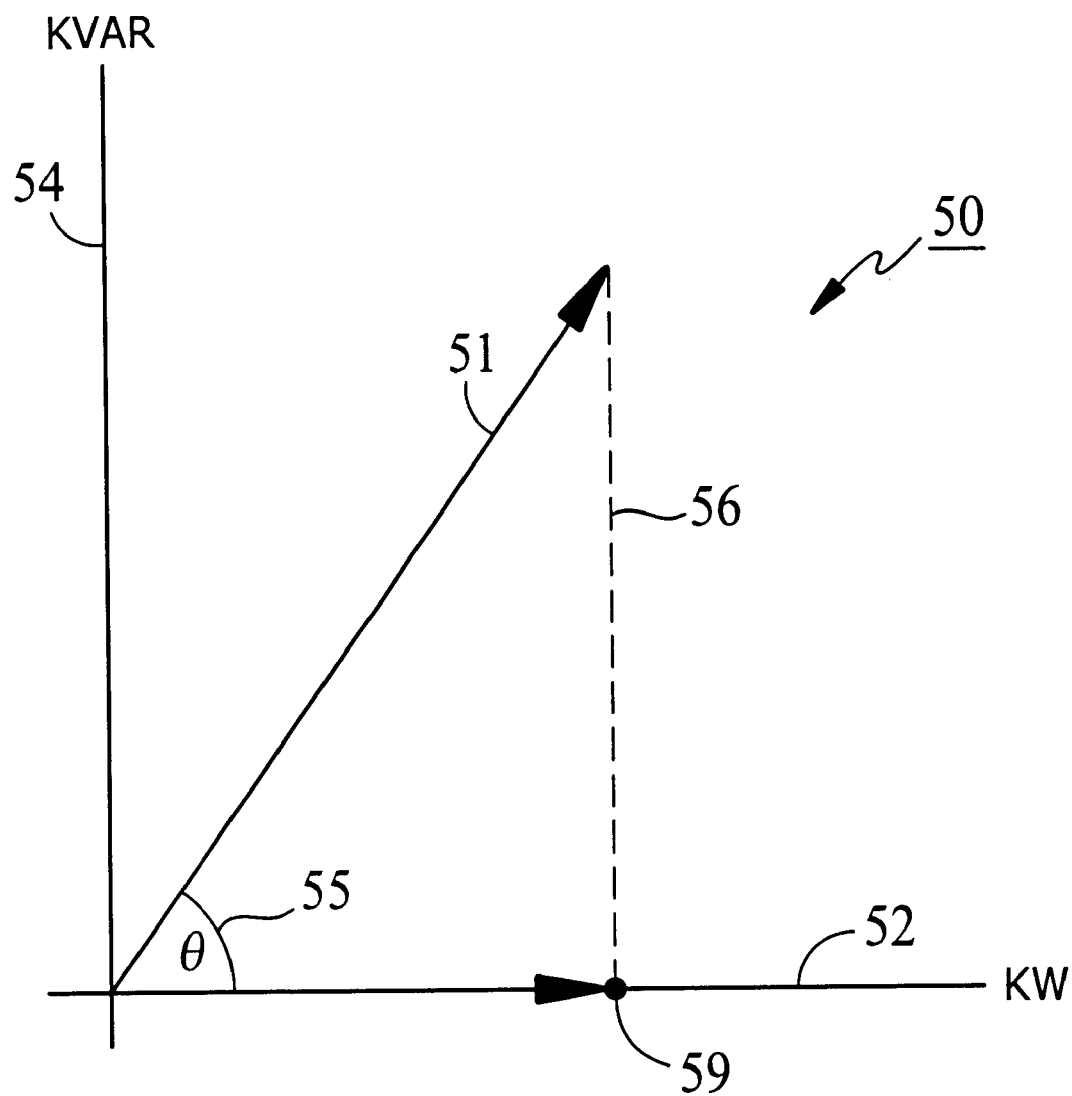
FIG. 9 is a vector diagram showing real and reactive components of output AC power.

Referring to FIG. 9, a vector diagram 50 illustrates the (sinusoidal) AC power output by inverter 17 as a function of real power (axis 52) and reactive power (axis 54). At real power axis 52, $I_{DEVICE}$ is at its maximum value. This corresponds to a time when superconducting magnet 10 is fully, or almost fully, charged. Inverter 17 outputs its maximum amount of real power ("kW") along real power axis 52. This is because real power is a function of the product of $V_{DC}$ and $I_{DEVICE}$ and $I_{DEVICE}$ is at its maximum. The vector output would lie on the real power axis 52 only for the special case of magnet power ($V_{DC}*I_{DEVICE}$) equal to the maximum inverter rating. Typically, the inverter power rating is greater than magnet power.

Along the reactive power axis 54, $I_{DEVICE}$ is at its minimum (in this case, zero). Inverter 17 outputs its maximum amount of reactive power ("kVAR") along reactive power axis 54 and uses the energy from this reactive power to maintain $V_{DC}$ substantially constant (since reactive power does not result in aggregate energy dissipation to the load). Reactive power may be sourced from the utility network and then output back to the utility network, or it may be obtained from other sources.

Between axes 52 and 54, the power output of inverter 17 is a combination of both real and reactive components. Power vector 51 represents the amount of power that is output by inverter 17. The degree to which power vector 51 is real or reactive is determined on the basis of phase angle ("θ") 55 between vector 51 and real power axis 52. For example, to determine the amount of real power provided by vector 51 at θ, a line 56 is drawn from vector 51 to real power axis 52. Intersection point 59 corresponds to the amount of real power provided by vector 51. Reactive power is determined similarly (by drawing a line from vector 51 to reactive power axis 54).

As energy is discharged from magnet 10, $I_{DEVICE}$ drops. The amount of current (and thus real power) output from inverter 17 can be reduced correspondingly by varying the phase angle. For example, in FIG. 8, the phase angle of the output current can be varied so that less real power is provided by inverter 17 (thus increasing θ).

FIG. 5 shows a process 62 for varying the phase angle of the AC output current during magnet discharging to keep $V_{DC}$ constant. Process 62 can be implemented as a computer program (instructions) executed by controller 27. Controller 27 first obtains a value of $V_{DC}$ (501). This value may be obtained, e.g., from controller 29 (which, as described above, monitors $V_{DC}$). Alternatively, controller 27 may obtain the value of $V_{DC}$ itself (by monitoring terminals 41) or from another source.

The phase angle of the AC power output from inverter 17 is controlled to keep $V_{DC}$ substantially constant (502). Controlling is performed by comparing (503 to 506) the value for $V_{DC}$ obtained in step 501 to a target (predetermined) value. This value may be preset in controller 27, or it may be set, for example, based on an initial value of $V_{DC}$. Alternatively, a controller within inverter 17 could perform this function.

The results of the comparisons in steps 503 to 506 determine how much, and in what direction, to vary the phase angle of the inverter's output AC current. For example, if process 62 determines (503) that the measured value of $V_{DC}$ is considerably larger than the target value (for example, a voltage nearing the inverter's maximum voltage rating), then process 62 decreases (507) the phase angle at a fairly rapid rate, such as the inverter's slew rate limit. This rapidly increases the amount of real power being supplied to utility network 61, and correspondingly decreases the value of $V_{DC}$. If process 62 determines (504) that the measured value of $V_{DC}$ is larger than the target value, but not inordinately so, then process 62 decreases (508) the phase angle at a less rapid rate, such as half of the inverter's slew rate limit. This increases the amount of real power being supplied to utility network 61, and correspondingly decreases the value of $V_{DC}$.

On the other hand, if process 62 determines (505) that the measured value of $V_{DC}$ is considerably less than the target value, then process 62 increases (509) the phase angle at a fairly rapid rate, such as the inverter's slew rate limit. This rapidly decreases the amount of real power being supplied to utility network 61, increases the amount of reactive power being supplied, and correspondingly increases the value of $V_{DC}$. If process 62 determines (506) that the measured value of $V_{DC}$ is less than the target value, but not inordinately so, then process 62 increases (510) the phase angle at a less rapid rate, such as half of the inverter's slew rate limit. This decreases the amount of real power being supplied to utility network 61, increases the amount of reactive power being supplied, and correspondingly increases the value of $V_{DC}$. Process 502 depicts a proportional control system which can be implemented in hardware, software, or a combination of the two. In simple terms, an error signal ($V_{DC}-V_{TARGET}$) is used to control a system variable (phase angle). The rate-of-change of the system variable is proportional to the error, hence the name: proportional controller.

The foregoing comparisons 503 to 506 operate to maintain $V_{DC}$ substantially constant during discharging (or charging) of magnet 10. While four such comparisons are shown, the invention is not limited as such. For example, there may only be two comparisons—one for determining if $V_{DC}$ is greater than the nominal value and one for determining if $V_{DC}$ is less than the nominal value. In this case, only one rate is used for increasing the phase angle of the output AC current and one rate is for decreasing that phase angle. Alternatively, the invention may include more than the four comparisons of process 62, each with its own corresponding rate for varying the phase angle.

Figure 10:
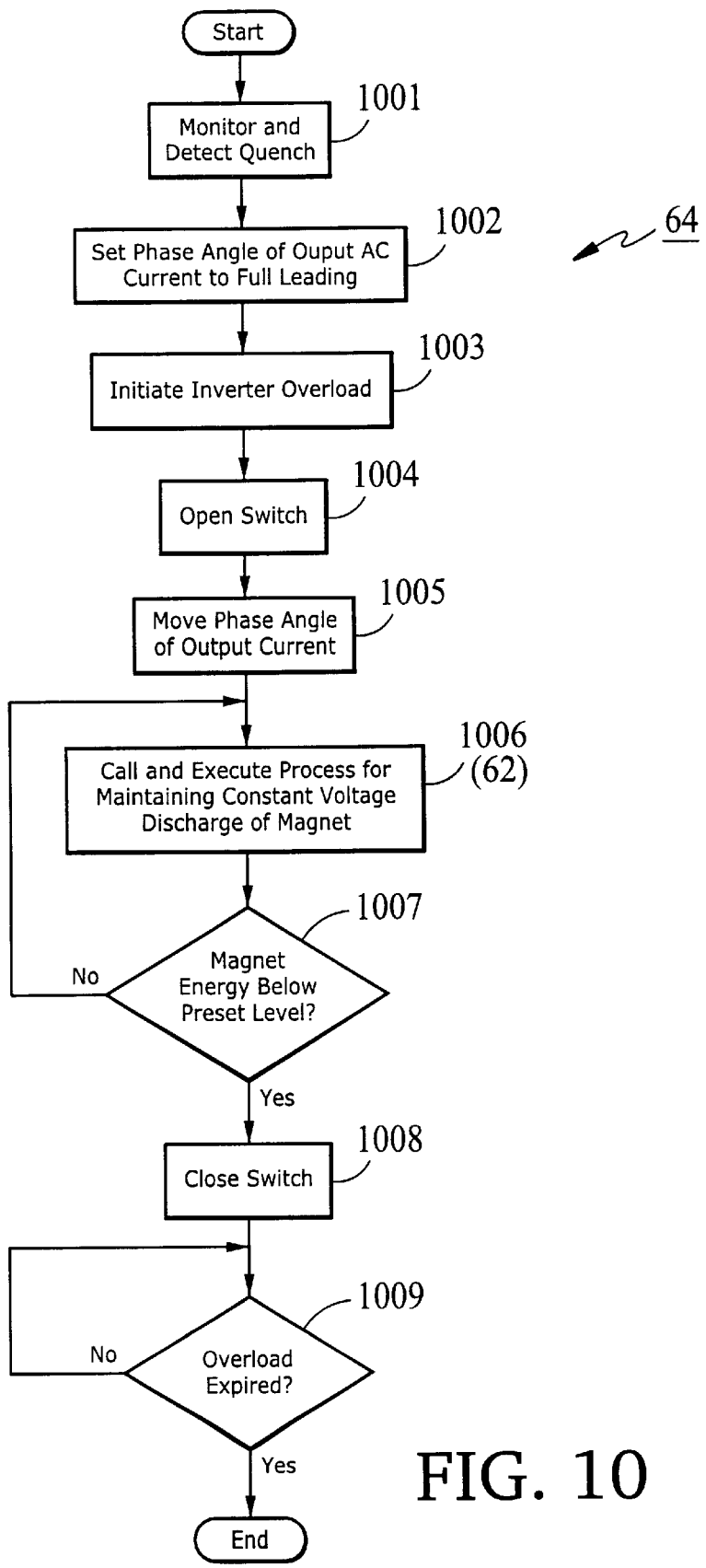
FIG. 10 is a flow diagram showing a process for discharging the superconducting magnet at constant voltage.

Process 62 may be incorporated into other processes. For example, FIG. 10 shows a process 64 that uses process 62 to discharge superconducting magnet 10 (FIG. 8) at a substantially constant $V_{DC}$ voltage. Process 64 may be implemented by a computer program (instructions) executing on one or more of controllers 27, 29 and 30 (FIG. 3).

To begin, process 64 monitors (1001) magnet 10 to detect a quench. This is described above. Once a quench has been detected, process 64 sets (1002) the phase angle of the inverter's output AC current to 90° (full leading). Process 64 initiates (1003) the overload mode of inverter 17, and opens (1004) switch 60 (FIG. 8) thereby allowing all current from magnet 10 to flow to inverter 17. In addition, it commands magnet charger 19 to turn off, thereby preventing additional power from flowing to the magnet. A minimum overload value in this case is 100% overload for one second (or two PU for one second, where "PU" is "Per Unit", the ideal continuous output current of inverter 17). Process 64 moves (1005) the phase angle of the output current in accordance with detected conditions in the magnet. For example, if a large resistive zone is detected in magnet 10, process 64 may decrease the phase angle considerably to discharge the magnet quickly. Then, process 64 calls (1006) process 62 for discharging the magnet while maintaining $V_{DC}$ substantially constant. Process 62 is performed until (1007) magnet 10 reaches a preset energy level, which is generally not zero.

Process 64 closes (1008) switch 60 and determines (1009) if the overload mode of the inverter has ended. Once the overload mode ends, process 64 ends, where after magnet 10 may be repaired and/or replaced, as required.

Figure 11:
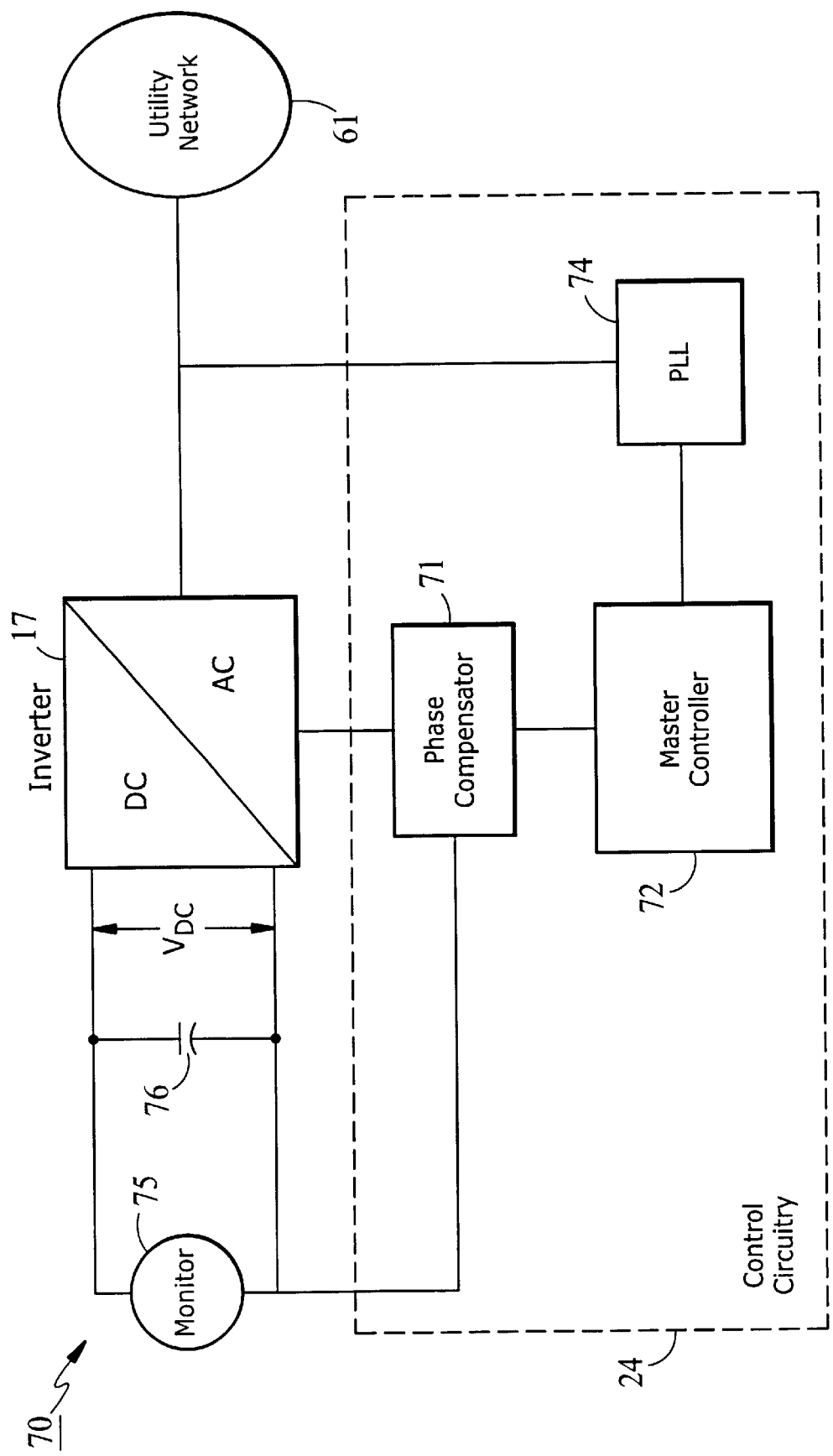
FIG. 11 is a block diagram of circuitry for compensating for inverter power loss during discharging of the superconducting magnet.

Power losses in inverter 17 may result in minor deviations in the phase angle of the output power. Such losses can cause minor fluctuations in $V_{DC}$ during charging and/or discharging. FIG. 11 is a block diagram of circuitry 70 that can be used to compensate for the power losses in inverter 17, and thus reduce fluctuations in $V_{DC}$. This circuitry 70 can be implemented using discrete hardware components and/or instructions executing on a controller. Master controller may be, for example, the control circuitry 24 of FIG. 3. PLL 74 may be implemented in software within one of controllers 27, 29 or 30. Phase compensator 71 may reside in software within a controller in inverter 17.

Circuitry 70 includes phase angle compensator 71, master controller 72, and phase-locked loop ("!PLL") 74. Also included in FIG. 11 are monitor 75 and DC bus capacitor 76. DC bus capacitor 76 stores an actual value of $V_{DC}$ across the input terminals of inverter 17. Monitor 75 monitors this value, compares it to a preset target voltage value, and determines a difference between the actual value of $V_{DC}$ and the preset nominal value. This information is provided to phase angle compensator 71.

PLL 74 and master controller 72 determine a phase angle of power on utility system 61 and output current sampled from inverter 17. This determination is based on voltage sampled from utility system 61. The phase angle is provided to phase angle compensator 71 (via master controller 72). Phase angle compensator 71 uses this phase angle and the difference in voltage provided from monitor 75 to determine a phase angle offset. The phase angle offset is the amount by which a phase angle set by inverter 17 must be offset to compensate for power losses in inverter 17. Generally, the phase angle offset has a negative value, which means that inverter 17 receives power from utility system 61 in order to compensate for the lost power.

Maintaining Constant Output Voltage

Inverter 17 is also controlled to maintain a substantially constant output AC voltage. The value of this output voltage may be dictated by the utility network or by whatever system is receiving power from inverter 17.

Figure 12:
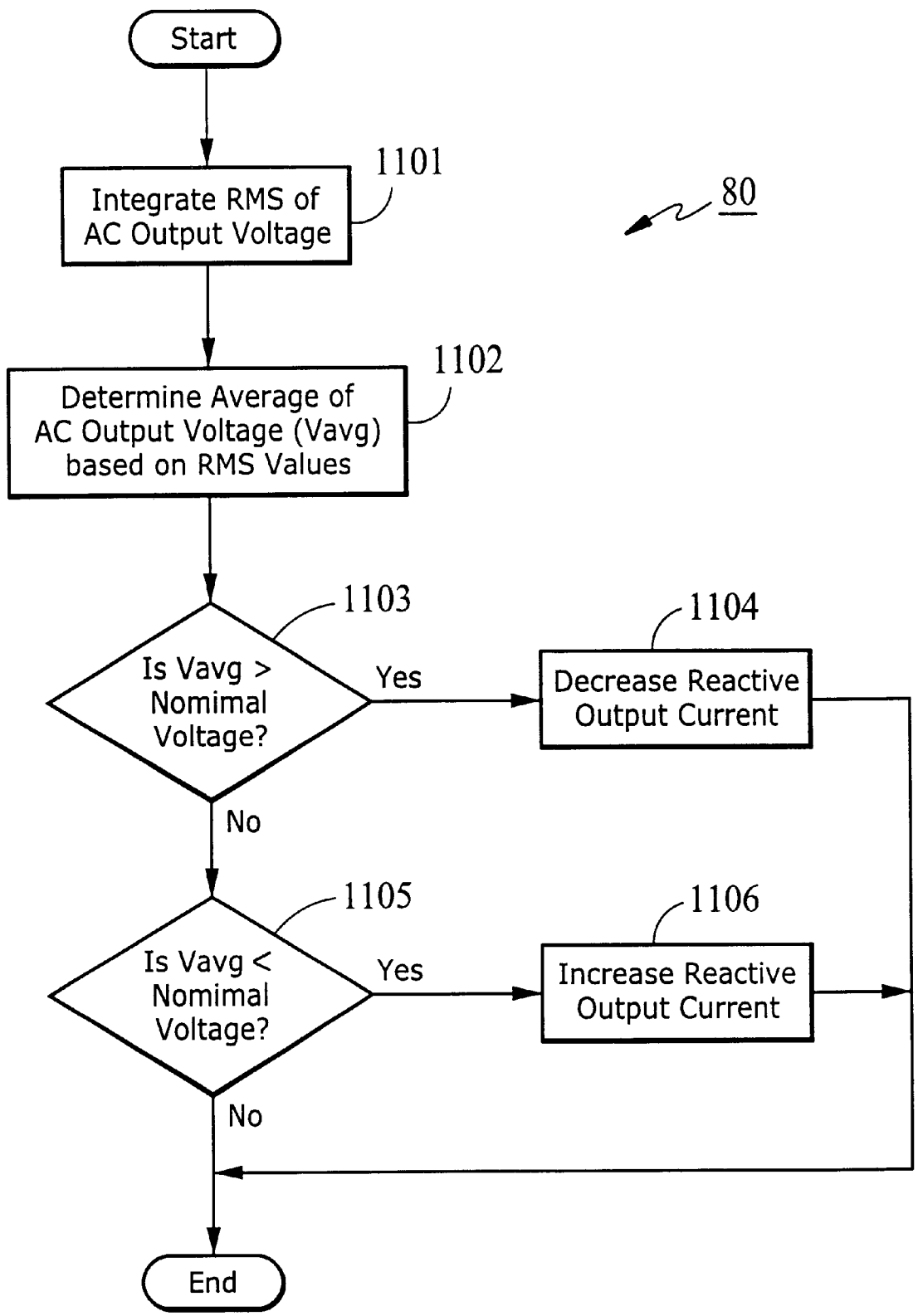
FIG. 12 is a flow diagram showing a process for controlling the phase angle of AC output current to keep the AC output voltage substantially constant.

The output AC voltage is controlled by regulating the output AC current and phase from inverter 17. Specifically, controller 27 senses (FIG. 3) the output AC voltage at terminals 77 of inverter 17 (FIG. 8) and regulates the magnitude of reactive current output from inverter 17 in order to keep the output AC voltage substantially constant. FIG. 12 shows a process 80, which is implemented by computer instructions executing on controller 27, for maintaining a substantially constant output AC voltage from inverter 17.

Process 80 begins by integrating (1101) the root-mean-square ("RMS") of the AC voltage output from inverter 17 over a period of time. This integration is performed several times on all three phases of voltage, and the results from all three phases are summed and are averaged (1102) to determine the average output voltage $V_{avg}$ of inverter 17. Process 80 compares (1103) $V_{avg}$ to a target voltage value, typically 1 PU which, in this example, is 480 V. If $V_{avg}$ is greater than this nominal value, process 80 decreases (1104) the reactive current out of inverter 17, which causes a corresponding decrease in output AC voltage. If $V_{avg}$ is less than this nominal value (1105), process 80 increases (1106) the reactive current out of inverter 17, which causes a corresponding increase in output AC voltage. Process 80 may be implemented independently on each phase or line of the utility system using a 3-phase inverter of a suitable type or three single-phase inverters.

It is noted that the reactive current can be leading or lagging. To boost or increase the voltage on a utility system, one can either decrease the amount of lagging reactive current or increase the amount of leading reactive current being injected into the utility. Likewise, to buck or decrease the utility voltage, one can decrease the leading current or increase the lagging injected current.

Other embodiments not described herein are also within the scope of the following claims. For example, the invention can be used in connection with any current-mode energy storage device, such as a synchronous flywheel, and not just superconducting magnets. Also, combinations of hardware and/or software not described herein may be used. For example, GTO ("Gate Turn-off Thyristor") or IGBT ("Insulated Gate Bipolar Transistor") switches may be used in the embodiments of the foregoing figures. The invention may be used in a DSMES ("Distributed Superconducting Magnetic Energy Storage System"), such as that described in U.S. patent application Ser. No. 09/240,751 and U.S. Provisional Application No. 60/117,784.

What is claimed is:

1. A method of discharging a superconducting magnet, comprising:

detecting a quench in the superconducting magnet; and discharging the superconducting magnet into a load at a substantially constant voltage in response to detecting the quench.

2. The method of claim 1, wherein the voltage is discharged through an inverter arranged between the superconducting magnet and the load.

3. The method of claim 2, wherein:

an input of the inverter receives voltage from an output of the superconducting magnet; and the substantially constant voltage is maintained at the input of the inverter by controlling a phase relationship between voltage and current at an output of the inverter.

4. The method of claim 3, wherein the inverter is operated in overload mode during discharge of the voltage from the superconducting magnet to the load.

5. The method of claim 1, wherein the load comprises a utility network.

6. The method of claim 1, wherein the load comprises one or more resistive elements.

7. The method of claim 1, wherein the quench is detected by monitoring a superconducting coil in the superconducting magnet.

8. The method of claim 1, wherein discharging occurs until an amount of energy in the superconducting magnet is below a predetermined level.

9. The method of claim 1, further comprising discharging the superconducting magnet into a load having a substantially constant resistance.

10. The method of claim 9, wherein discharging the superconducting magnet into the load having the substantially constant resistance occurs after discharging the superconducting magnet at the substantially constant voltage.

11. A system for discharging a superconducting magnet, comprising:

a load; and circuitry which (i) detects a quench in the superconducting magnet, and (ii) discharges the superconducting magnet into the load at a substantially constant voltage in response to detecting the quench.

12. The system of claim 11, wherein the circuitry comprises an inverter arranged between the superconducting magnet and the load.

13. The system of claim 12, wherein:

the inverter includes an input from the superconducting magnet and an output to the load, the input for receiving voltage from an output of the superconducting magnet, and the output for discharging AC power to the load; and the inverter maintains the substantially constant voltage at the input of the superconducting magnet by controlling a phase relationship between voltage and current in the AC power at the output of the inverter.

14. The system of claim 12, wherein the inverter operates in overload mode during discharge of the voltage from the superconducting magnet to the load.

15. The system of claim 11, wherein the load comprises a utility network.

16. The system of claim 11, wherein the load comprises:

one or more resistive elements; and switches which control connection of the one or more resistive elements to the superconducting load to maintain discharge at the substantially constant voltage.

17. The system of claim 11, wherein the quench is detected by monitoring a superconducting coil in the superconducting magnet.

18. The system of claim 11, wherein discharge occurs until an amount of energy in the superconducting magnet is substantially dissipated.

19. The system of claim 11, further comprising a profiling circuit coupled in shunt between the superconducting magnet and the load, the profiling circuit comprising a switch and one or more resistive elements;

wherein the switch connects the profiling circuit to the output terminals of the superconducting magnet after a predetermined amount of energy has been discharged from the superconducting magnet.

\* \* \* \* \*